(No Model.)

S. GASSER.
ROTARY CULTIVATOR.

No. 479,800. Patented Aug. 2, 1892.

Witnesses
Jas. K. M?Lachran
J. W. Diggers

Inventor
Sanford Gasser
By his Attorneys,
C. A. Snow & Co.

UNITED STATES PATENT OFFICE.

SANFORD GASSER, OF TROUT CREEK, MICHIGAN.

ROTARY CULTIVATOR.

SPECIFICATION forming part of Letters Patent No. 479,800, dated August 2, 1892.

Application filed March 30, 1892. Serial No. 427,030. (No model.)

*To all whom it may concern:*

Be it known that I, SANFORD GASSER, a citizen of the United States, residing at Trout Creek, in the county of Ontonagon and State of Michigan, have invented a new and useful Rotary Cultivator, of which the following is a specification.

This invention relates to improvements in cultivators of that class known as "rotary," and has particular reference to certain novel improvements over United States Patent No. 464,561, granted me December 8, 1891. In the aforesaid patent I employed an axle, upon which was mounted a rectangular frame supporting at its front end a transversely-disposed hopper having an agitator-shaft provided with a sprocket operated by a chain driven from a sprocket on the axle. A cultivator-frame was loosely suspended at its front end from the rectangular frame, could be raised and lowered, and was provided with a transverse shaft carrying curved harrow or cultivator teeth, the said shaft being rotated through the medium of a sprocket-chain operated by a master-gear on one of the ground-wheels and engaged with a sprocket-wheel on the said shaft.

By experience I have found that the cultivator operated efficiently upon flat ground, but indifferently upon rolling ground, sides of hills, &c. Such objection arose from the fact that the cultivator-frame was rigid, except at its point of pivot to the main frame, or, in other words, that the side bars of the cultivator-frame were always in alignment.

The objects of my present invention are to so construct the cultivator-frame as to render it flexible, so that the side bars will have independent movement up and down, and thus the rotary cultivator be adapted to operate efficiently upon the sides of hills or rolling or undulating ground, always conforming to the nature of the same.

With these objects in view the invention consists in certain features of construction hereinafter specified, and particularly pointed out in the claims.

Figure 1:
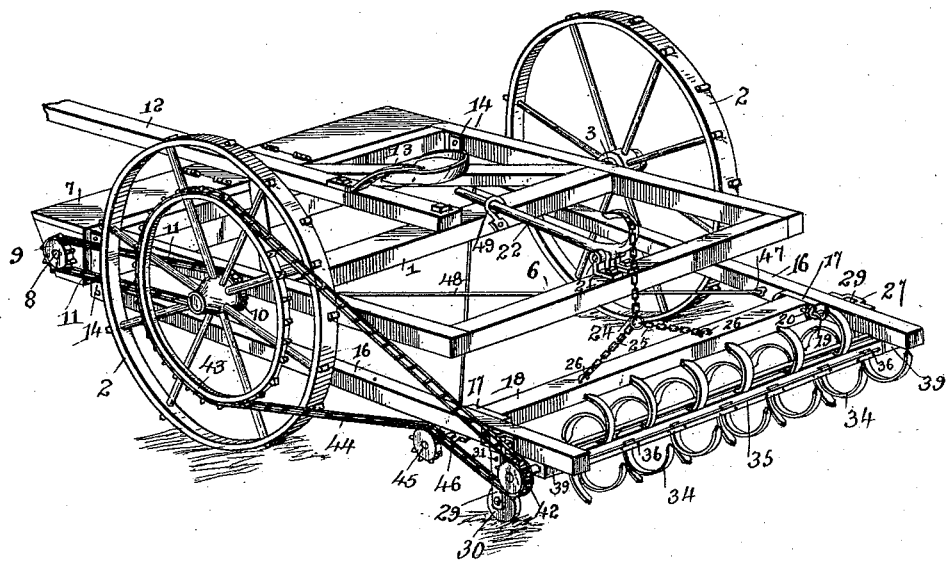
Figure 2:
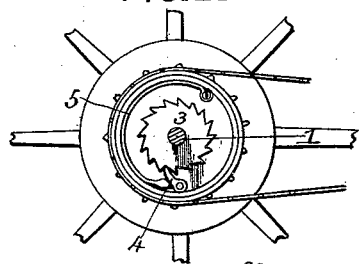
Figures 5, 6:
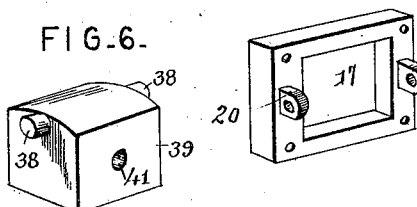
Figure 3:
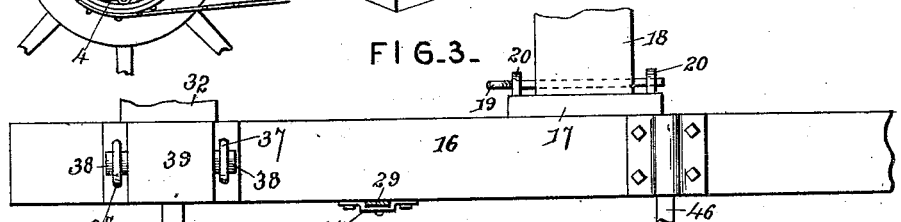
Figure 4:
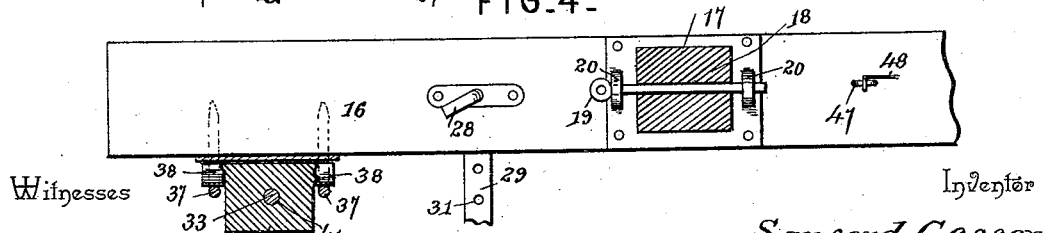

Referring to the drawings, Figure 1 is a perspective of a cultivator constructed in accordance with my invention. Fig. 2 is an inner face view of one of the hubs. Fig. 3 is a bottom plan view of one of the side bars of the cultivator-frame. Fig. 4 is a transverse sectional view through the cross-bars of the cultivator-frame. Fig. 5 is a detail in perspective of one of the castings hereinafter described. Fig. 6 is a similar view of one of the cultivator-bar-supporting castings.

Like numerals of reference indicate like parts in all the figures of the drawings.

Proceeding, briefly, to describe the unimportant part of my present invention, 1 designates the axle, and 2 the ground-wheels loosely mounted thereon and provided at their inner faces with annular recesses, in each of which is located the ratchet-wheel 3, rigidly mounted upon the axle. A pawl 4 is pivoted to the inner face of each hub, and a light coiled spring 5 maintains the free end of the same normally in engagement with the ratchet-wheel. By this means the axle is made to rotate with the wheels when the machine is drawn forwardly and remain stationary when the machine is backed. Secured to the front end of the rectangular frame 6, which surmounts the axle between the wheels, is a seed-hopper 7, from one end of which extends the agitator-shaft 8, upon which is located and adapted to rotate therewith a small sprocket-wheel 9. A small sprocket 10 is mounted on the axle, and a sprocket-chain 11 connects the wheels 9 and 10, whereby motion is conveyed from the axle to the agitator-shaft. A draft-bar or tongue 12 is mounted upon the frame 6, and rising from the same is a seat-supporting standard 13.

Pairs of hangers 14 depend from the opposite side bars of the frame 6 near the front ends of the latter, and pivoted to the same, as at 15, is a pair of rearwardly-disposed side bars 16, located between the wheels and extending in rear of the frame 6. To the inner side of each of the side bars cast-metal plates 17 are bolted, and these plates have their adjacent faces recessed to receive the ends of a transverse connecting-bar 18. The bar 18 near its ends is perforated, and pivot-pins 19 pass loosely through the perforations and through perforated ears 20, formed on each plate at the opposite sides of the recesses in the adjacent faces of the plates. It will thus be seen that so far as the cross-bar 18 is concerned the bars 16 are capable of independent vertical movement, though at the same time they are connected by the said bar 18.

Bearings 21, mounted on the rear bar of the frame 6, have fulcrumed therein a lever 22, the rear end of which is curved, as shown, while the front end is extended forwardly adjacent to the seat for the driver and within ready reach of him when seated upon the machine. From the curved end of this lever a chain 24 depends and is branched at its lower end, as at 25, and connected to eyes or staples 26, located upon the upper side of the cross-bar 18 at each side of the center of the latter.

Keepers 27 are secured to each of the side bars 16 near their rear ends and at their outer sides. These keepers are perforated and receive removable pins 28, which extend therethrough and through the bars 16. In each keeper is mounted a vertical standard 29, at the lower end of which is located a revoluble caster-wheel 30, and each standard is provided with a series of perforations 31, through any one of which the above-mentioned pins may be passed. By this means the bars 16 and transverse bar 18, constituting a cultivator-framework, may be raised and lowered, or, in other words, adjusted with relation to the ground, for a purpose hereinafter apparent.

32 designates the cultivator-bar, and the same in cross-section is rectangular or square and is provided at its opposite ends with reduced bearings 33. Between its bearing ends curved cultivator-teeth 34 are secured to each of the surfaces of the cultivator-bar in any desired manner, but in the present instance by means of metal strips 35, arranged over the shanks of the cultivator-teeth and bolted, as at 36, to the bar at each side of each shank.

Immediately in rear of each of the caster-standards, before mentioned as being applied to each of the side bars 16, there is located a pair of eyebolts 37, arranged a short distance apart. These eyebolts accommodate a pair of trunnions 38, located at the front and rear sides of bearing-blocks 39, whereby the said bearing-blocks are pivotally secured to the under sides of the bars 16 and are capable of lateral movement independent of the bars to which they are secured. These bearing-blocks are provided with transverse bearings 41, and in the same take the reduced bearings before mentioned as being formed at the ends of the cultivator-shaft. One of the bearing ends of the cultivator-shaft is extended beyond its bearing-blocks and is provided at said extended end with a small sprocket-wheel 42. A large sprocket-wheel 43 is secured to the spokes of one of the ground-wheels, and a sprocket-chain 44 passes over the same around the aforesaid small sprocket 42. In order to maintain this chain taut, an idle-sprocket 45 is mounted upon a stub-shaft 46, extending from one of the side bars 16, said chain passing over the idle-sprocket.

Eyes 47 are located at the front ends of the bars 16 and immediately in front of the cross-bar 18, and each diagonal pair of eyes is connected by a diagonally-disposed rod 48.

This completes the construction of the machine, and its operation will be at once obvious when considered in connection with the drawings and the foregoing description.

By means of the lever before mentioned the cultivator-frame as a whole may be raised and lowered, so as to be thrown out of and into operative position, and when thrown out may be thus held by engaging the free end of the lever under a hook 49, secured to an intermediate transverse bar of the frame 6. As the machine is drawn along motion is conveyed in the manner described to the cultivator-shaft, which is thus rapidly revolved, the cultivator-teeth operating in the usual way. It will be seen that by reason of the loose connections between the opposite side bars 16 the same may assume different elevations, and hence incline the cultivator-shaft, which latter will yield to the various undulations of the ground operated upon, and will operate as efficiently upon undulating ground or the sides of hills as upon a flat piece of ground.

Having described my invention, what I claim is—

1. In a cultivator of the class described, the combination, with the axle, wheels, and main frame, of the opposite side bars loosely connected at their front ends to the main frame, opposite boxes loosely connected to the side bars and adapted to oscillate and provided with bearings, a transverse cultivator-shaft, cultivators mounted thereon, and means for operating said shaft, substantially as specified.

2. In a cultivator of the class described, the combination, with the axle, ground-wheels, and main frame, of the opposite side bars loosely connected at their front ends to the main frame, the transversely-opposite bearing-boxes provided at their opposite sides with trunnions, bearing-eyes depending upon the side bars and loosely receiving the trunnions, a transverse cultivator-shaft terminating in bearing ends mounted in the bearings of the boxes, and means for rotating the shaft, substantially as specified.

3. In a cultivator of the class described, the combination, with the wheels, axle, and main frame, of opposite side bars pivotally connected at their front ends to the frame, opposite bearing-boxes mounted for oscillation at the under side of the side bars and provided with bearings, a transversely-disposed tooth-carrying cultivator-shaft, means for rotating the shaft, a hand-lever pivoted on the main frame, a transverse connecting-bar between the two side bars, pivotal connections between the side bars and the ends of the transverse bars, and a chain connected to the lever and to the transverse bar, substantially as specified.

4. In a cultivator of the class described, the combination, with the wheels, axle, and main frame supported on the latter, of the opposite side bars loosely connected at their front ends to the main frame, the opposite bearing-boxes loosely suspended and adapted to oscillate under the side bars, the transverse cultivator-shaft mounted for rotation in said boxes, the opposite plates secured to the inner sides of the side bars and provided with central recesses and opposite bearing-eyes, the transverse bar terminating in the recesses, the pivoting-pins passed through the eyes and bar, the lever fulcrumed on the main frame, and the chain connecting the lever and bar, substantially as specified.

5. In a cultivator of the class described, the combination, with the axle, wheels, and main frame, of the opposite cultivator-bars loosely connected at their front ends to the main frame, the transverse bar loosely pivoted at its ends to said bars, the loosely-suspended oscillating bearing-boxes, the transverse cultivator-shaft journaled therein, means for operating said shaft, the front and rear eyes secured, respectively, near the front and rear ends of the side bars, the diagonally-disposed rods, the lever, and the chain connecting the lever with the cross-bar, substantially as specified.

In testimony that I claim the foregoing as my own I have hereto affixed my signature in the presence of two witnesses.

SANFORD GASSER.

Witnesses:
W. H. OAKLEY,
W. C. MANNIS.